United States Patent
Kurian et al.

(10) Patent No.: US 12,292,992 B2
(45) Date of Patent: May 6, 2025

(54) DATA SWAPPING USING A CATEGORIZED DATA MESH

(71) Applicant: Bank of America Corporation, Charlotte, NC (US)

(72) Inventors: Manu Kurian, Dallas, TX (US); Ganesh Bonda, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 226 days.

(21) Appl. No.: 18/201,515

(22) Filed: May 24, 2023

(65) Prior Publication Data
US 2024/0394391 A1 Nov. 28, 2024

(51) Int. Cl.
G06F 21/62 (2013.01)
G06F 16/906 (2019.01)

(52) U.S. Cl.
CPC ........ *G06F 21/6218* (2013.01); *G06F 16/906* (2019.01)

(58) Field of Classification Search
CPC .. G06F 16/906; G06F 21/6218; G06F 16/908; G06F 21/604; G06F 21/62; G06F 21/6209
See application file for complete search history.

(56) References Cited

U.S. PATENT DOCUMENTS

| | | | | |
|---|---|---|---|---|
| 2021/0216657 A1* | 7/2021 | Saad | ...................... | G06F 3/0623 |
| 2022/0067216 A1* | 3/2022 | Bokade | ................... | G06F 21/78 |

* cited by examiner

*Primary Examiner* — Olugbenga O Idowu
(74) *Attorney, Agent, or Firm* — Weiss & Arons LLP (57) ABSTRACT

Apparatus, methods and systems for securely trade data from one node by another node is provided. Methods may include receiving raw data at a node. Methods may include categorizing the data. Methods may include classifying the data. Methods may include assigning data grades to the data. Methods may include assigning security levels to the data. Methods may include storing the data at a data mesh. Methods may include determining a resource consumption metric ("RCM") for the data. Methods may include transmitting the data. The dataset may be acquired for a value specified by the RCM. Methods may include improving the data. Methods may include recategorizing, reclassifying and reassigning a security level to the data. Methods may include storing the improved data in the data mesh. Methods may include determining a new RCM for the improved data. Methods may include transmitting the improved data. Methods may include managing the transmission of the data with a third node.

20 Claims, 9 Drawing Sheets

DATA SWAPPING USING A CATEGORIZED DATA MESH

FIELD OF TECHNOLOGY

The field of technology relates to decentralized data storage.

BACKGROUND OF THE DISCLOSURE

Many entities may receive large amounts of raw data. The raw data may include different datasets. The different datasets may correspond to different domains. Each dataset may have a unique value. It may be difficult to identify unique values when datasets are in their raw form. It may be difficult to classify and store datasets when the datasets are in their raw form. Data, in its raw form, may be cumbersome to store and process.

Therefore, it may be desirable to create a system for classifying and assigning data value representations. It may be desirable to provide a system for storing the classified datasets in a categorized data mesh. Storing the raw data in the categorized data mesh may improve both the storage and processing time. As such data entities may improve datasets. The data mesh may then be accessible to multiple users and entities.

Therefore, a categorized data mesh may be desirable. The categorized data mesh, with predefined data value representations, may allow for trusted and dynamic data brokerage between users and entities. Additionally, it may be desirable to use the predefined data value presentations along with security clearance levels as a determining factor when identifying data values.

Furthermore, it may be desirable to provide a system for dynamic data swapping in a categorized data mesh. It may be desirable to provide a system to identify the value of data in its raw and improved form.

SUMMARY OF THE DISCLOSURE

Systems, apparatus and methods for dynamic data swapping in a categorized data mesh are provided. Methods may include receiving raw data at a node. The node may be a computer. The node may be a server. The node may be any suitable computing device. The raw data may include one or more datasets.

Methods may include classifying the raw data. The data may be classified at a data classification engine. The data classification engine may execute an artificial intelligence ("AI") model. The data classification engine may include hardware components. The data classification engine may include software components. The data classification engine may include a computing device. The data classification engine may include a hardware processor. The data classification engine may include a hardware memory.

Classifying the raw data may include separating the raw data into one or more datasets. The raw data may be separated into one or more datasets using the AI model. Classifying may further include determining a data categorization for each dataset. The data categorization may correspond to a domain. Domain for the purposes of this application may be understood to mean an aggregation of entities organized around a common functional entity purpose. Each domain may include customized controls, preset conditions and any other suitable domain differentiation. The domains for each dataset may be unique. The domains may be industry specific. The domains may be task specific.

Classifying may further include assigning an access level to each of the one or more datasets. The access level may correspond to a level of obtainability of the data. For example, some data may be common data. Common data may include data that is available at a greater than a threshold level of availability—i.e., readily available data. Some data may be rare data. Rare data may include data that is available at a less than a threshold level of availability,—i.e., less readily available. Data that is more readily available may be assigned a lower access level. Data that is less readily available may be assigned a higher access level. Access levels may include a range of access levels. The access levels may be included in a predetermined set of access levels. The access level may be a corresponding numeric value.

Classifying may further include assigning a control setting to each of the one or more datasets. A control setting may correspond to a manageability rating of the data. For example, some data may include complex encryptions and algorithms. Such data may be less manageable than a threshold manageability level. Data that is determined as less manageable may require additional skill to manage the data.

Some data may be easily manipulatable data. Such data may be more manageable than a threshold manageability rating. Data determined as more manageable may not require special skills or knowledge to manage the data. Data that is of greater manipulatable difficulty may be assigned a higher-level control setting. Data that is less manageable may be assigned a lower-level control setting. Control settings may include a range of control settings. The control settings may be included in a predetermined set of control settings. The control setting may be a corresponding numeric value.

Classifying may further include assigning a data value to each of the one or more datasets. The data value may correspond to a ranking of usefulness of the data. For example, data may be determined through historical metadata, to be useable data. Useable data may be data that delivers value to a user. Such value may include data efficiencies, bandwidth reduction and any other suitable data values. Some data may be determined to be less than a threshold usability value,—i.e., less usable data. Less usable data may deliver less value to a user. Some data may be determined to be greater than a threshold usability value,—i.e., more usable data. More usable data may deliver greater value to a user Data that is more usable may be assigned a greater data value. Data that is less usable may be assigned a smaller data value. Data values may include a range of data values. The data values may be included in a predetermined set of data values. The data value may be a corresponding numeric value.

Methods include computing a data grade for each of the one or more datasets. The computing may be based on a combination of assigned characteristics of the dataset. The combination may include the assigned numeric access level. The combination may include the assigned numeric control setting. The combination may include the assigned numeric data value. The data grade may correspond to a range of predetermined data grades. The range may incorporate a variety of possible data grade values.

Methods may include assigning the computed data grade to each of the datasets. Methods may include tagging each dataset with a security clearance level. The security level may be a predetermined security level. The predetermined security level may correspond to a predetermined security level included in a plurality of predetermined levels of security.

The plurality of predetermined levels of security may include levels ranging from a high security level to a low security level. The levels may be assigned a corresponding number value. A level 1 security level may correspond to a low security level. The level 1 security level may allow for minimal access to data. A level 5 security level may correspond to a high security level. The level 5 security level may allow for access to most of the data, greater than a predetermined percentage. Security levels may include a level 2 security level, a level 3 security level, a level 4 security level and any other suitable security level.

Methods may include storing each dataset at a location in the data mesh. The location in the data mesh may correspond to the determined data categorization of the dataset. The location in the data mesh may correspond to the assigned data grade of the dataset. The location in the data mesh may correspond to the tagged security level of the dataset. The location may correspond to a combination of the data categorization, the assigned data grade and/or the tagged security level.

Methods may include determining a resource consumption metric ("RCM") for each of the datasets. The RCM may be based at least in part on the data grade of the dataset. The RCM may be based at least in part on the security level of the dataset. The RCM may be definable quantum of resources necessary for a transmission node to provide to an acquisition node in order to acquire the dataset. As the data grade increases, the RCM may increase. As the data grade decreases, the RCM may decrease. As the security clearance level decreases, the RCM may increase. As the security clearance level increases, the RCM may decrease.

Methods may include storing the determined RCM in a metadata location associated with the dataset. Methods may include storing the tagged security level in a metadata location associated with each dataset. The metadata location may be stored in a repository. The repository may be located within the data mesh. The repository may be located remote from the data mesh.

In some embodiments, the node, which may be identified as a first node, and the dataset may be identified as a first dataset. Methods may include receiving a data acquisition request at the first node. The data acquisition request may be from a second node. The data acquisition request may request acquisition of the dataset.

In response to receiving the data acquisition request, methods may include mining the determined RCM and security level for the requested dataset. The mining may use an application programming interface ("API").

Methods may include transmitting the mined RCM and security level to the second node. Methods may include determining that the second node has an assigned security level that is the same or greater than an assigned security level of the dataset. In response to determining that the second node has an assigned security level that is the same or greater than an assigned security level of the dataset, methods may include approving the acquisition of the dataset.

The second node may transfer an amount of resources corresponding to the determined RCM to the first node. In response to receiving the amount of resources from the second node, the dataset may be transmitted from the first node to the second node.

Methods may include determining that the second node has an assigned security level that is less than an assigned security level of the dataset. In response to determining that the second node has an assigned security level that is less than an assigned security level of the dataset, methods may include preventing or halting the acquisition of the dataset.

Methods may include dynamically updating the RCM of the dataset. Methods may include acquiring the first dataset from the first node, at a second node.

Methods may include enhancing data included in the dataset. Enhancing may include improving the quality of the data. For example, reformatting the data. The enhanced data may include any suitable improvement, such as an improvement in data value, accessibility, manageability and the like. The enhanced data may create a second dataset.

Methods may include determining an updated data categorization for the second dataset. Determining an updated data categorization may include determining if there is any change in the categorization of the dataset based on the enhancements.

Methods may include assigning an updated access level to the second dataset. The updated access level may correspond to an update in the level of obtainability of the data. In the event that the access level was not updated, methods may include retaining the access level from the first dataset. Methods may include assigning an updated control setting to the second dataset. The updated control setting may correspond to an update in the rating of manageability of the data. In the event that the control setting was not updated, methods may include retaining the control setting from the first dataset. Methods may include assigning an updated data value to the second dataset. The updated data value may correspond to an update in usability of the data. In the event that the data value was not updated, methods may include retaining the data value from the first dataset.

Methods may include computing an updated data grade for the second dataset. The computing may be based on a combination of the access level, the control setting, the data value assigned to the second dataset, and any other suitable information. The updated data grade may be greater than the computed data grade of the first dataset. The updated data grade may be lower than the computed data grade of the first dataset.

Methods may include tagging the second dataset with a security clearance level. Methods may include storing the second dataset at a corresponding location within the data mesh. Methods may include determining an updated RCM for each of the datasets. The updated RCM may be based at least in part on the updated data grade. The updated RCM may be based at least in part on the tagged security level of the second dataset. The updated RCM of the second dataset may be greater than the determined RCM of the first dataset. The updated RCM of the second dataset may be less than the determined RCM of the first dataset.

Methods may include storing the updated RCM in a metadata location associated with the second dataset. Methods may include storing the tagged security level in a metadata location associated with the second dataset.

Methods may include managing, from a third node, the acquiring of the dataset by the second node from the first node. The third node may serve as a broker between the second and first node. The third node may verify that a dataset exchange is legitimate. The third node may verify that a dataset exchange is secure.

Methods may include storing the datasets at the data mesh. The data mesh may be divided into specific regions. Each region may be defined by a domain. The different regions may be associated with one of the plurality of nodes. Each of the regions may be in electronic communication with the remaining regions included in the plurality of regions. Data may be transmitted from one region to another region. The data mesh may store datasets in regions corresponding to the determined data categorization of the dataset.

The data classification engine may use training datasets to train the AI model. The data classification engine may also use testing datasets to train the AI model.

The data classification engine may use a machine learning algorithm to use previously captured data to create training datasets. Training datasets may include a plurality of previously analyzed data. The previously analyzed data may accurately classify data by domain, security clearance level, accessibility level, control setting, data value, and/or any other suitable metric thereby enabling training of the AI model. Training datasets may be used by the system to recognize new domains, security clearance levels, accessibility levels, control settings, data values and the like. The new classifications may be added to the group of predetermined classifications.

Testing datasets may be comprised of randomly selected datasets. A computer-based testing dataset may test the accuracy of the classifications assigned to the selected datasets. The testing dataset may help improve the accuracy of the AI model. The testing dataset may determine if the newly recognized classifications are effective in classifying the new domains, security clearance levels, accessibility levels, control settings and/or data values of the datasets.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Apparatus, methods and systems for dynamic data swapping in a categorized data mesh are provided.

The apparatus may include a data mesh. The data mesh may be a decentralized data storage system. The data mesh may include a plurality of regions. Each of the regions may be associated with one of the plurality of nodes. Each of the regions may be in electronic communication with the remaining regions included in the plurality of regions. Data may be transmitted from one region to another region. The data mesh may store datasets. The data mesh may store datasets in regions corresponding to a determined data categorization of the dataset.

The apparatus may include a node. The node may be a computing device. The node may be a laptop, smartphone, desktop, tablet, mainframe or any other suitable computing device. The node may be included in the network. The node may be excluded from the network. The node may receive raw data. The raw data may include one or more datasets.

The apparatus may include a data classification engine. The data classification engine may run an artificial intelligence ("AI") model. The data classification engine system may include hardware components. The data classification engine may include software components. The data classification engine may include a computing device. The data classification engine may include a hardware processor. The data classification engine may include a hardware memory.

The data classification engine may classify the raw data. The data classification engine may separate the raw data into one or more datasets. The data classification engine may determine a data categorization for each dataset. The data categorization may correspond to a domain. A domain, for the purposes of this application, may be understood to mean an aggregation of entities organized around a common functional entity purpose. Each domain may include customized controls, preset conditions and any other suitable domain differentiation. The domains may be unique. The domains may be industry specific. The domains may be task specific.

The data classification engine may assign an access level to each of the one or more datasets. The access level may correspond to a level of obtainability of the data. The access level may correspond to a level availability of the data. Greater availability levels of the data may be assigned greater access levels. Lower availability levels of the data may be assigned lower access levels.

The data classification engine may assign a control setting to each of the one or more datasets. The control setting may correspond to a rating of manageability of the data. The control setting may correspond to a complexity of the data settings. Greater complexity in the dataset settings may be assigned greater control settings. Lower complexity in the dataset settings may be assigned lower control settings.

The data classification engine may assign a data value to each of the one or more datasets. The data value may correspond to a ranking of usefulness of the data. The data value may correspond to a level of desirability of the data. Greater levels of data desirability may be assigned greater data values. Lower levels of data desirability may be assigned lower data values.

The data classification engine may compute a data grade for each of the one or more datasets. The computation may be based on a combination of the assigned access level, the control setting and/or the data value. Each of the components may be equally represented in an equal combination. Each of the components may be unequally represented in a weighted combination.

The data classification engine may assign the computed data grade to each of the datasets. The data classification engine may tag each dataset with a security level. The security level may correspond to a security allowance level determined for each dataset.

The data classification engine may store each dataset in a location in a data mesh. The location may correspond to the determined data categorization. The location may correspond to the assigned data grade. The location may correspond to the tagged security level.

The data classification engine may determine a resource consumption metric ("RCM") for each of the datasets. The RCM may be a determined amount of resources necessary to transmit to a transmitter of the dataset in order to acquire the dataset. The RCM may be an amount of resources necessary to provide in order to acquire rights to the dataset. The resources may be computing resources. The resources may be any suitable transferable resources. The determined RCM may be based at least in part on the data grade. The determined RCM may be based at least in part on the tagged security level.

The data classification engine may store the determined RCM and tagged security level in a metadata location associated with each dataset. The metadata location may be at a repository. The repository may include a memory. The repository may be associated with the data mesh.

The apparatus may include a node. The node may be identified as a first node. The node may include a dataset. The dataset may be identified as a first dataset. The first node may receive an acquisition request from a second node. The acquisition request may request acquisition of the dataset. The first node may use an application programming interface ("API") to mine the determined RCM and security level for the dataset. The API may mine the determined RCM and security level from the associated metadata location.

The first node may transmit the mined RCM and security level to the second node. In response to a determination that the second node has an assigned security level that is the same or greater than an assigned security level of the dataset the first node may approve the acquisition of the dataset. In response to a receipt of an amount of resources corresponding to the determined RCM of the dataset, the first node may transmit the dataset to the second node. The resources may be received from the second node. If the second node does not transmit the amount of resources corresponding to the RCM, the first node may prevent or halt the transmission of the dataset.

In response to a determination that the second node has an assigned security level that is less than an assigned security level of the dataset, the first node may prevent the transmission of the dataset.

The second node may dynamically update the RCM of the dataset. The second node may acquire the first dataset from the first node. The acquisition of the dataset by the second node from the first node may be managed by a third node. The third node may be a broker between the first and second node. The third node may ensure that the transfer of the dataset is secure.

The second node may enhance data included in the dataset. The enhanced dataset may be a second dataset. Enhancement of the data may include any suitable improvement, such as an improvement in data value, accessibility, manageability and the like.

The data classification engine may determine an updated data categorization for the second dataset. The updated data categorization may correspond to a domain. The updated data categorization may be the same as the first dataset. The updated data categorization may be different than the first dataset.

The data classification engine may assign an updated access level to the second dataset. The data classification engine may assign an updated control setting to the second dataset. The data classification may assign an updated data value to the second dataset. The updated data classifications may be the same as the data classifications of the first dataset. The updated classifications may be different than the classifications of the second dataset.

The data classification engine may compute an updated data grade for the second dataset. The computation may be based on a combination of the updated access level, the updated control setting and/or the updated data value assigned to the second dataset. The updated data grade may be greater than the computed data grade of the first dataset. The updated data grade may be less than the data grade assigned to the first dataset.

The data classification engine may tag the second dataset with a security level. The security level of the second dataset may be different than the security level assigned to the first dataset. The security level of the second dataset may be the same as the security level assigned to the first dataset.

The data classification engine may store the second dataset at a corresponding location. The location may be within the data mesh. The data classification engine may determine an RCM for the second dataset. The second RCM may be based at least in part on the data grade and security level. The data classification engine may store the determined RCM and tagged security level in a metadata associated with the second dataset. The metadata may be stored in the repository associated with the data mesh.

The determined RCM of the second dataset may be greater than the determined RCM of the first dataset. The determined RCM of the second dataset may be lower than the determined RCM of the first dataset.

The data classification engine may be configured to use testing and training datasets to train the AI model.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
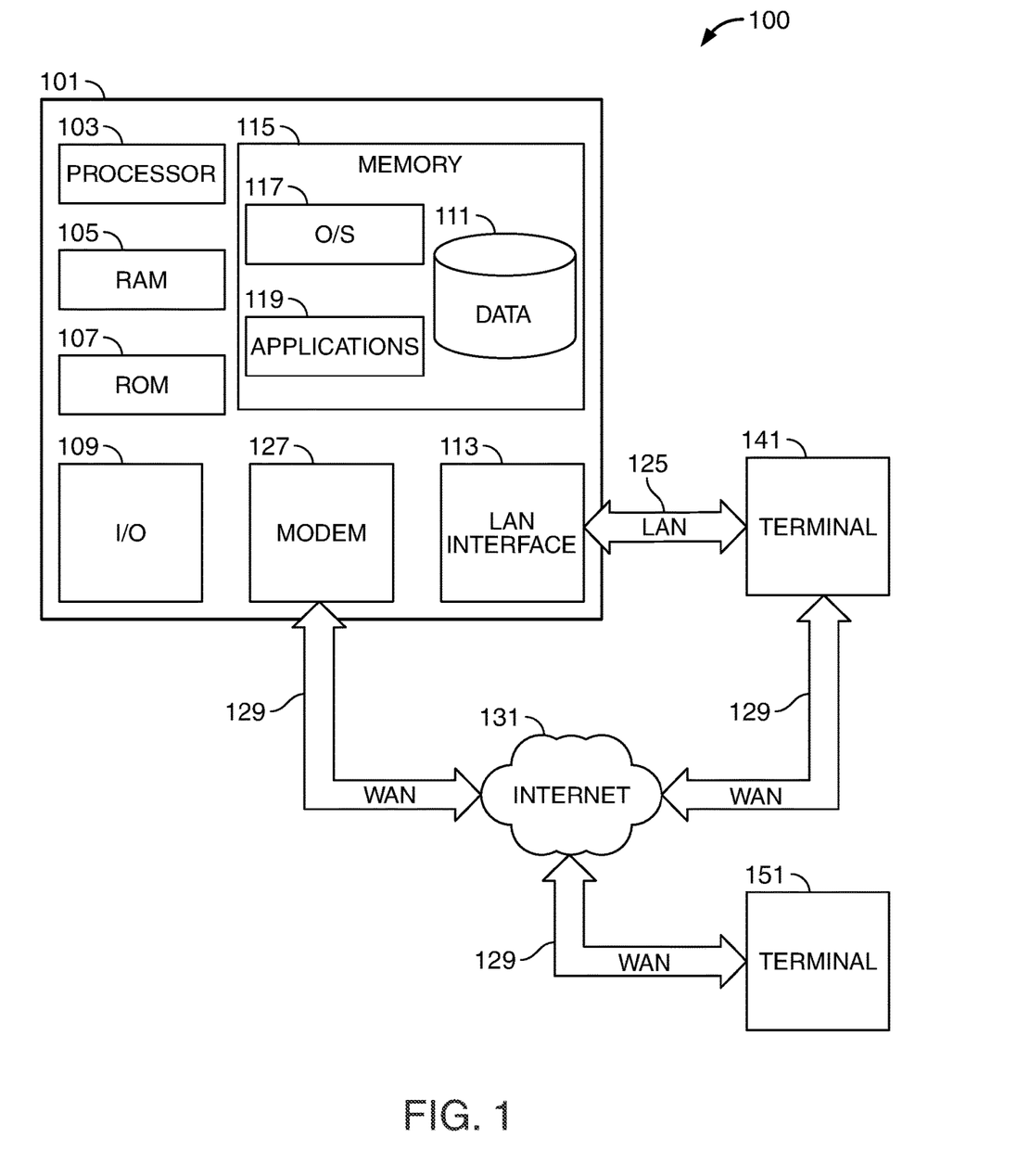
FIG. 1 shows an illustrative diagram in accordance with principles of the invention.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the nodes, the data classification engine, the data mesh and any other part of the disclosure may include some or all of apparatus included in system 100.

Computer 101 may have a processor 103 for controlling the operation of the device and its associated components and may include RAM 105, ROM 107, input/output circuit 109 and a non-transitory or non-volatile memory 115. Machine-readable memory may be configured to store information in machine-readable data structures. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text and/or audio assistance files. Nodes, the data mesh, the repository, and the data classification engine as disclosed herein may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. Connections between System 100 and Terminals 151 and/or 141 may be used for the nodes to communicate with the data mesh.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS) and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
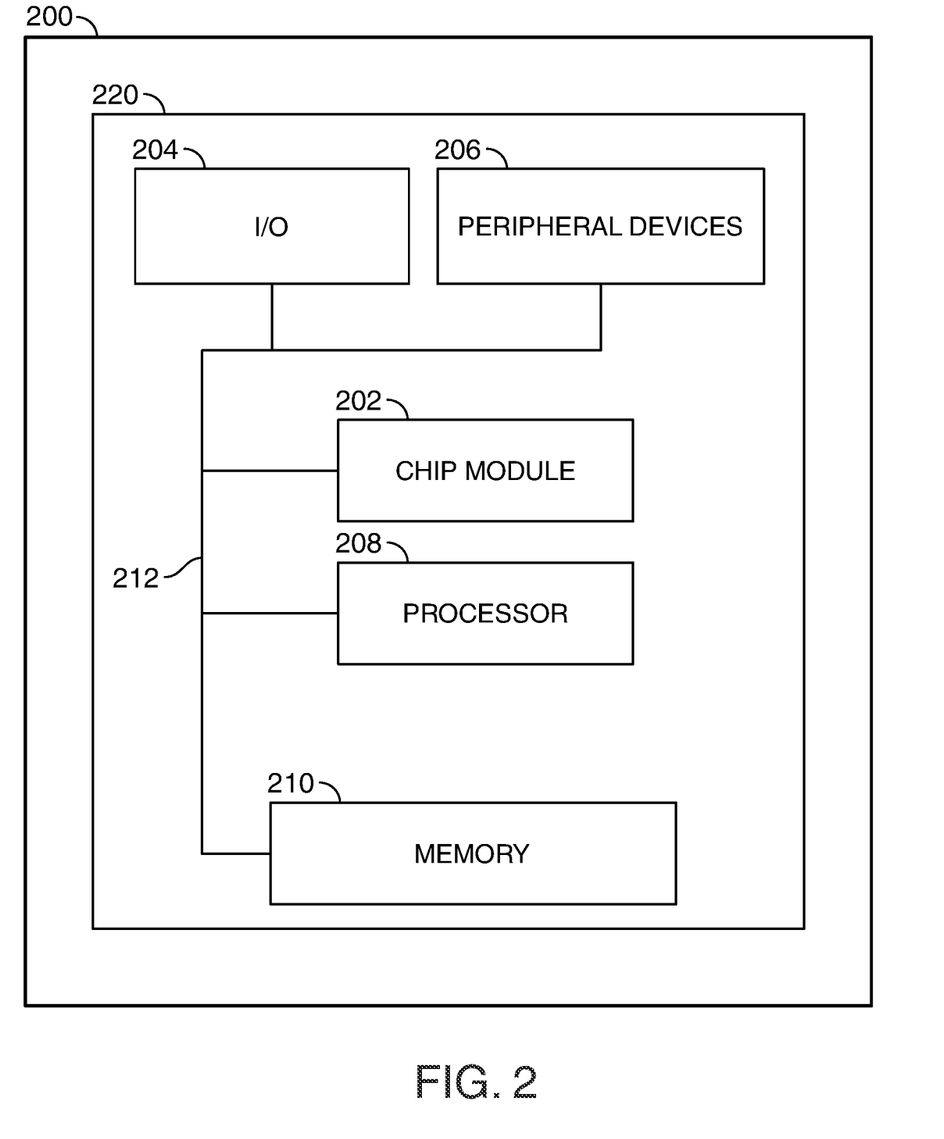
FIG. 2 shows another illustrative diagram in accordance with principles of the invention.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
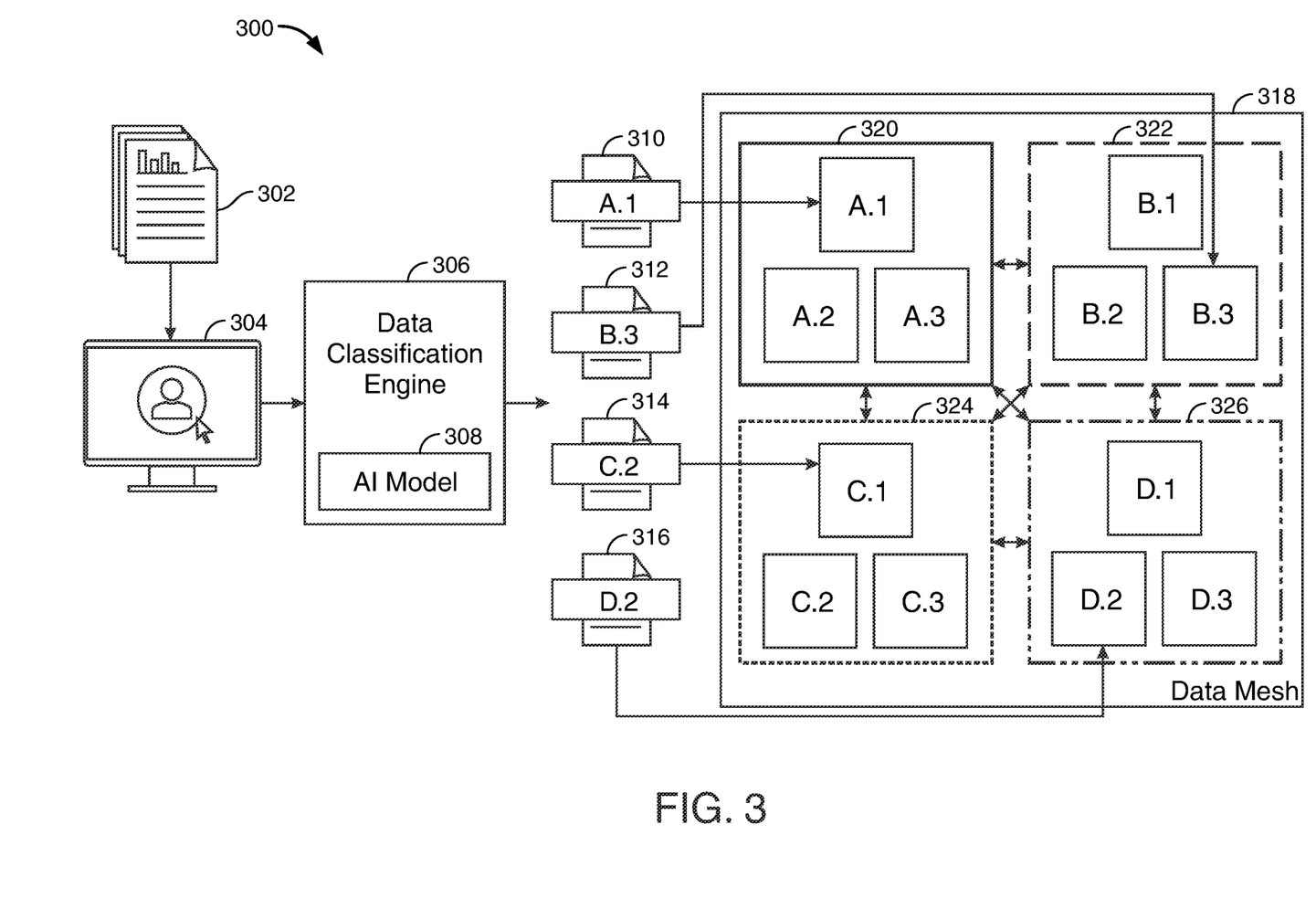
FIG. 3 shows yet another illustrative diagram in accordance with principles of the invention.

FIG. 3 shows illustrative system 300. System 300 may include raw data 302. Node 304 may receive raw data 302. Node 304 may be a computing device. Node 304 may be a computer, tablet, smartphone, laptop, mainframe, or any other suitable computing device. Node 304 may be included in a network. The network may be an edge network, a local network, a wireless network and/or any other suitable network. Node 304 may include one or more of the parts described above in relation to computer 101. Raw data 302 may originate from a different network than node 304. Raw data 302 may originate from the same network as node 304.

Raw data 302 may be transmitted through data classification engine 306. Data classification engine 306 may be executing artificial intelligence ("AI") model 308. Data classification engine 306 may be a computing device. Data classification engine 306 may be a software program. Data classification engine 306 may be any suitable classification algorithm.

Data classification engine 306 may fragment raw data 302 into dataset 310, dataset 312, dataset 314 and dataset 316. Data classification engine 306 may classify dataset 310, dataset 312, dataset 314 and dataset 316. Dataset 310 may be classified as A.1. Dataset 312 may be classified as B.3. Dataset 314 may be classified as C.2. Dataset 316 may be classified as D.2.

System 300 may include data mesh 318. Data mesh 318 may be divided into regions 320, 322, 324 and 326. Regions 320, 322, 324 and 326 may be in electronic communication with regions 320, 322, 324 and 326. Regions 320, 322, 324 and 326 may correspond to a specific domain. Domains may include an aggregation of entities organized around a common functional entity purpose. Each domain may include customized controls, preset conditions and any other suitable domain differentiation. Regions 320, 322, 324 and 326 may be subdivided by security levels, controls, data value and the like.

Node 304 may store datasets 310, 312, 314 and 316 at data mesh 318. Datasets 310, 312, 314 and 316 may be stored at one or more regions within data mesh 318, that corresponds to the dataset's classification. Dataset 310 may be stored at a corresponding location in region 320. Dataset 312 may be stored at a corresponding location in region 322. Dataset 314 may be stored at a corresponding location in region 324. Dataset 316 may be stored at a corresponding location in region 326.

Figure 4:
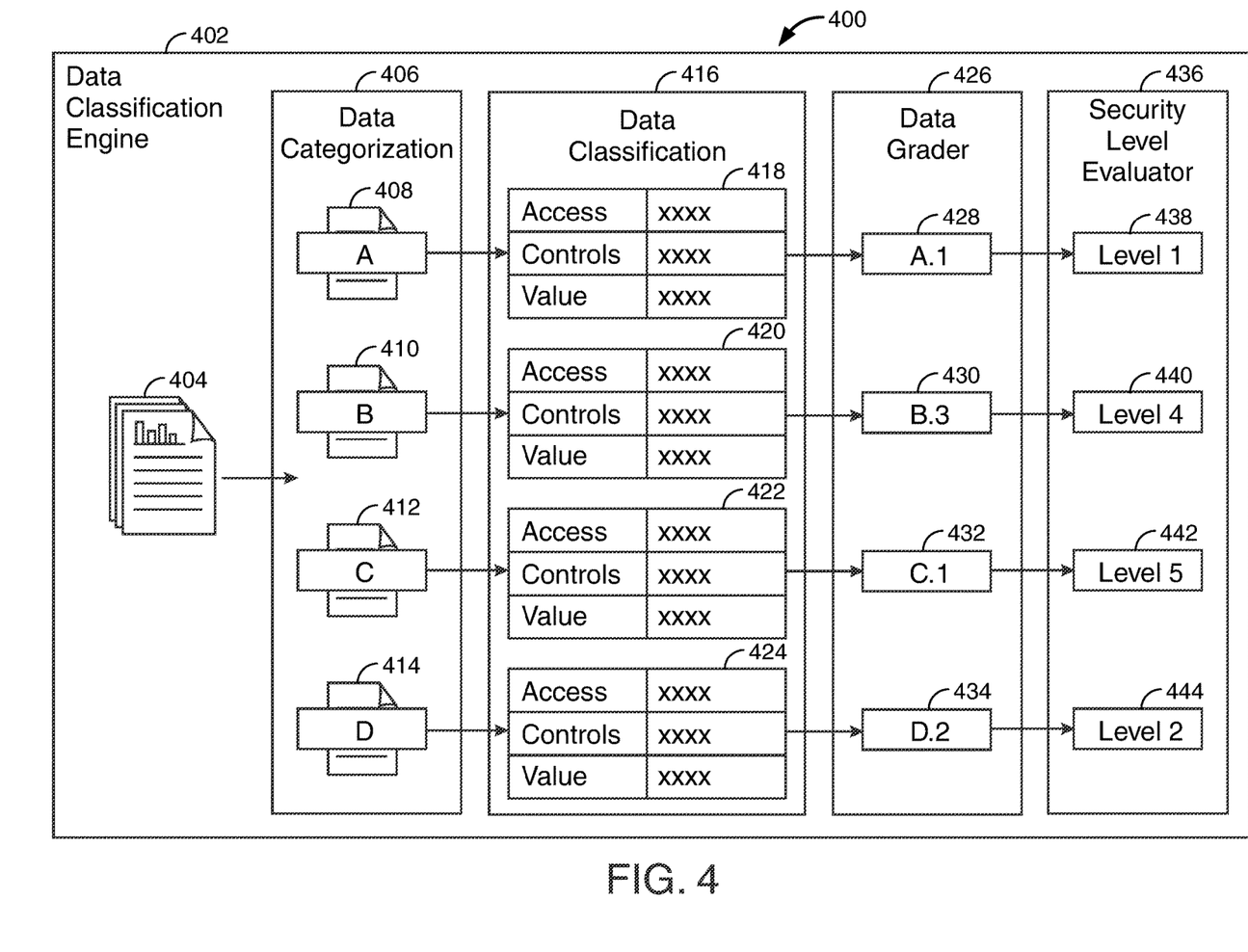
FIG. 4 shows still another illustrative diagram in accordance with principles of the invention.

FIG. 4 shows illustrative system 400. System 400 shows data classification engine 402. Data classification engine 402 may include some or all of the features of data classification engine 306 described in FIG. 3. Data classification engine 402 may include an AI model (not shown). Data classification engine 402 may receive raw data 404. Raw data 404 may be separated into datasets at data categorization 406. Raw data 404 may be separated based on a domain related to the data included in each dataset. Dataset 408 may be determined to be categorized as data A. Dataset 410 may be determined to be categorized as data B. Dataset 412 may be determined to be categorized as data C. Dataset 414 may be determined to be categorized as data D.

After the data is categorized at data categorization 406, the data may be classified at data classification 416. Data classification 416 may include assigning an access level, control setting and/or a data value to each dataset. The access level, control setting and data value may correspond to a numeric value. Dataset 408 may be assigned access level, control setting and data value 418. Dataset 410 may be assigned access level, control setting, and data value 420. Dataset 412 may be assigned access level, control setting and data value 422. Dataset 414 may be assigned access level, control setting and data value 424.

After the dataset is classified at data classification 416, a data grade may be calculated for the dataset. The dataset may be calculated at data grader 426. The data grade may be calculated using the data categorization and data classification score assigned to each dataset. The classification score may be calculated by combining the numeric values associated with the access level, control setting and data value assigned to each dataset. The first letter of the data grade may represent the data categorization. The numbers in the data grade may represent the classification score of the data.

Data grader 426 may calculate a data grade for dataset 408. Dataset 408 may be assigned data grade 428. Data grade 428 may represent both the categorization and the classification of dataset 408. Dataset 408 may be assigned a data grade of A.1. The "A" may correspond to the data categorization. The 0.1 may correspond to a combination of data classification 418. The combination of data classification 418 may include the access level, control setting and data value associated with dataset 408. Dataset 410 may be assigned data grade 430. Dataset 410 may be assigned a data grade of B.3. Dataset 412 may be assigned data grade 432. Dataset 412 may be assigned data grade C.1. Dataset 414 may be assigned data grade 434. Dataset 414 may be assigned a data grade of D.2.

After the dataset is assigned a data grade, the dataset may be assigned a security level at security level evaluator 436. The security level may be determined based on historical background of the data included in the metadata of each dataset. The security level may correspond to a predetermined security clearance level. The predetermined security clearance level may be included in a plurality of predetermined levels of security clearance.

Dataset 408 may be assigned security level 438. Security level 438 may be a level 1 security level. Dataset 410 may be assigned security level 440. Security level 440 may be a level 4 security level. Dataset 412 may be assigned security level 442. Security level 442 may be a level 5 security level. Dataset 414 may be assigned security level 444. Security level 444 may be a level 2 security level. A level 5 security level may allow access to unclassified data. A level 1 security level may allow access to highly classified data. Security levels in between levels one and five may include varying levels of accessibility to classified data.

Figure 5:
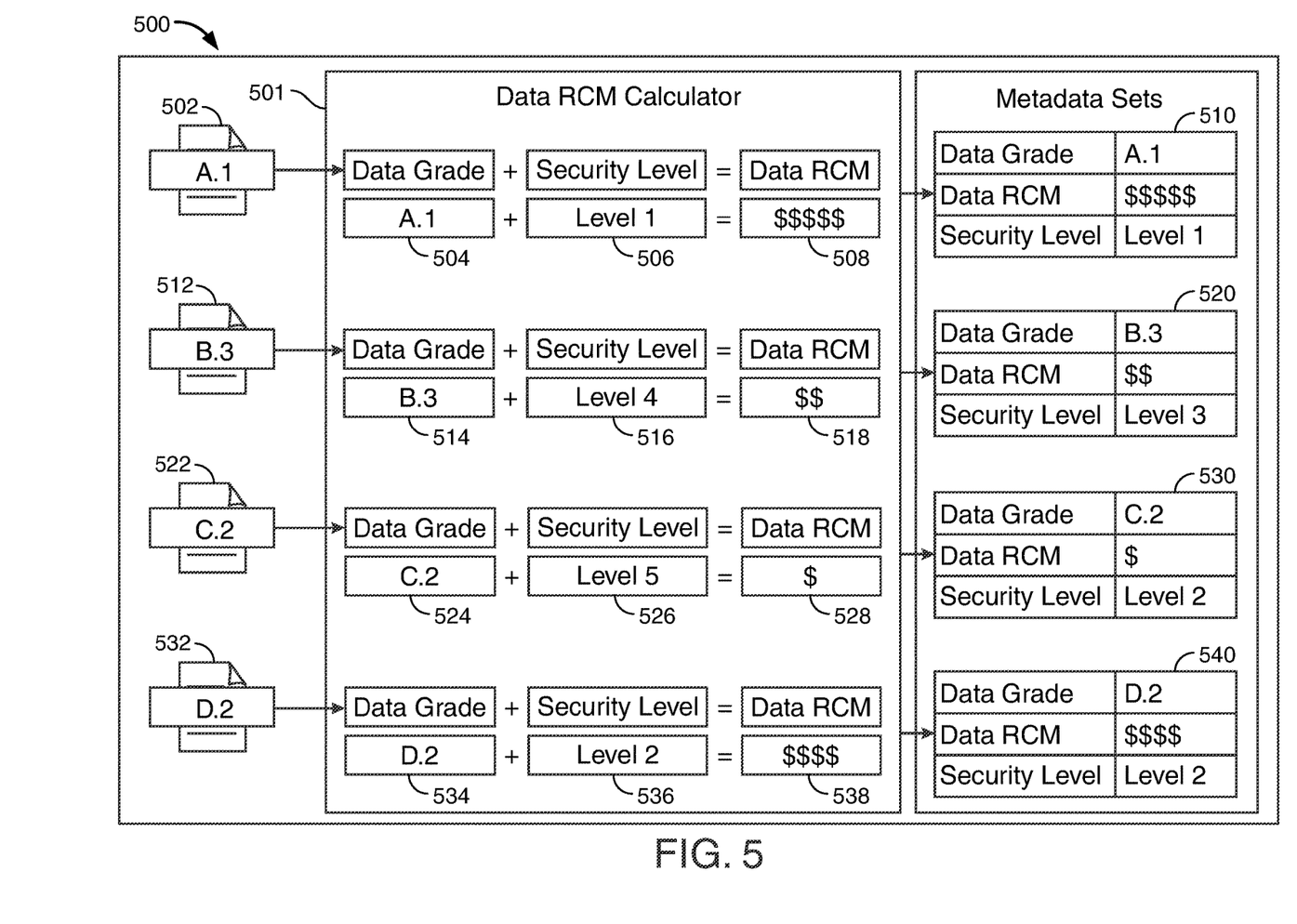
FIG. 5 shows yet another illustrative diagram in accordance with principles of the invention.

FIG. 5 shows illustrative system 500. System 500 may include one or more features in common with systems 300 and 400. System 500 may include resource consumption metric ("RCM") calculator 501. RCM calculator 501 may assign an RCM to each dataset. The RCM may correspond to a value of the dataset. The RCM may be an amount of resources that are required to be provided in order to acquire the dataset. RCM calculator may calculate the RCM for datasets 502, 512, 522 and 532. RCM calculator may use data grade 504 and security level 506 to calculate RCM 508 for dataset 502. RCM calculator may use data grade 514 and security level 516 to calculate RCM 518 for dataset 512. RCM calculator may use data grade 524 and security level 526 to calculate RCM 528 for dataset 522. RCM calculator may use data grade 534 and security level 536 to calculate RCM 538 for dataset 532.

The determined RCMs and security levels may be stored in a metadata location associated with each dataset. The RCM and security level assigned to dataset 502 may be stored in metadata location 510. The RCM and security level assigned to dataset 512 may be stored in metadata location 520. The RCM and security level assigned to dataset 522 may be stored in metadata location 530. The RCM and security level assigned to dataset 532 may be stored in metadata location 540.

Figure 6:
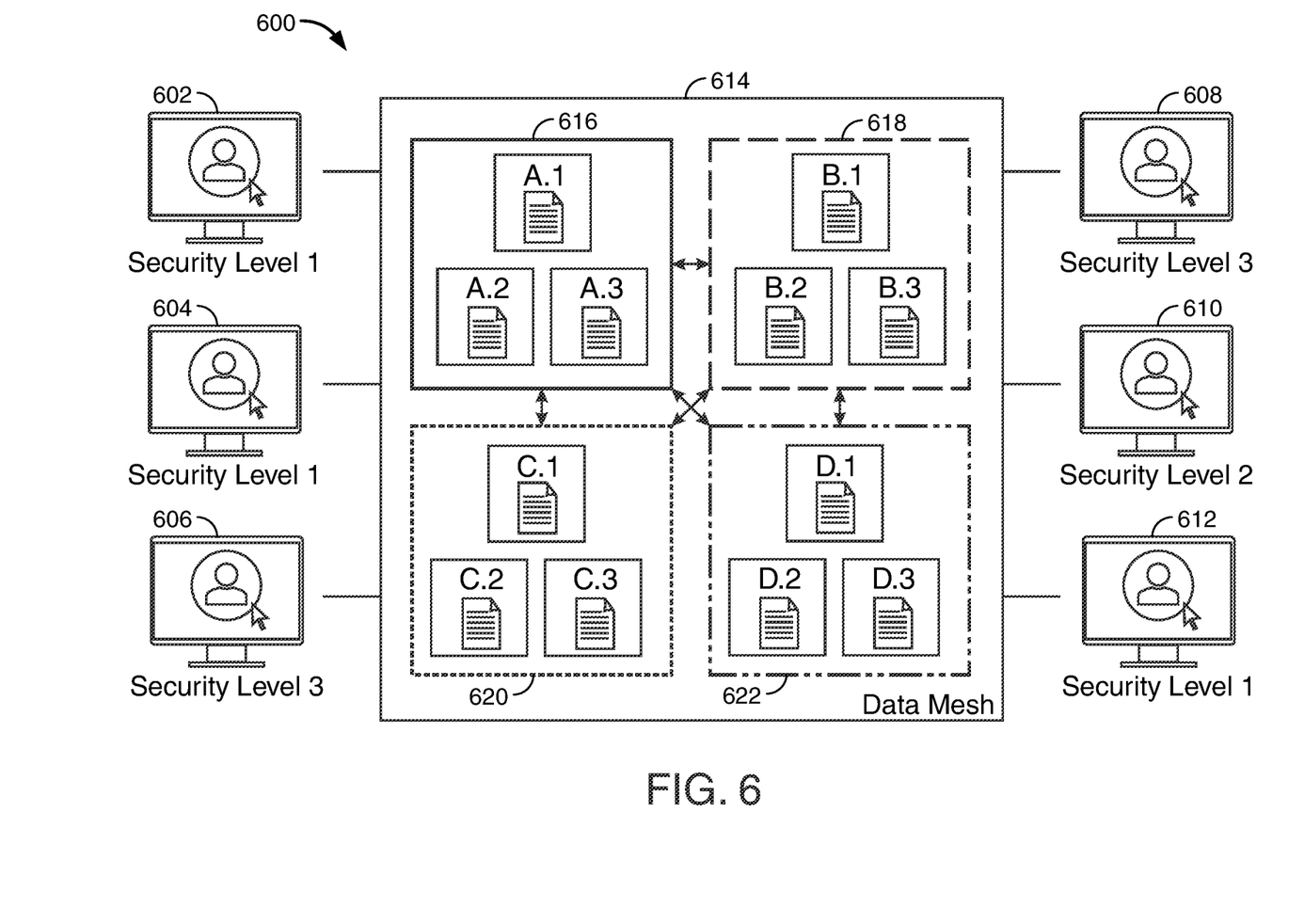
FIG. 6 shows still another illustrative diagram in accordance with principles of the invention.

FIG. 6 shows illustrative system 600. System 600 may include one or more of the features of systems 300, 400 and 500. System 600 may include data mesh 614. Data mesh 614 may be included in a network. Data mesh 614 may be divided into regions 616, 618, 620 and 622. Each region may correspond to a specific domain. The different regions may be in electronic communication with other regions. Data may be transferred between the different regions. Each region may be further divided into security levels.

System 600 may include nodes 602, 604, 606, 608, 610 and 612. Nodes 602, 604, 606, 608, 610 and 612 may be any suitable computing device. Nodes 602, 604, 606, 608, 610 and 612 may have one or more features in common with computer 101. Each of nodes 602, 604, 606, 608, 610 and 612 may be assigned a security level. Node 602 may be assigned a security level of 1. Node 604 may be assigned a security level of 1. Node 606 may be assigned a security level of 3. Node 608 may be assigned a security level of 3. Node 610 may be assigned a security level of 2. Node 612 may be assigned a security level of 1. A level 5 security level may allow access to unclassified data. A level 1 security level may allow access to highly classified data. Security levels in between levels one and five may include varying levels of accessibility to classified data.

Each of nodes 602, 604, 606, 608, 610 and 612 may be in electronic communication with a region of the data mesh. Each node 602, 604, 606, 608, 610 and 612 may only access data that corresponds to the security level of the node.

Figure 7:
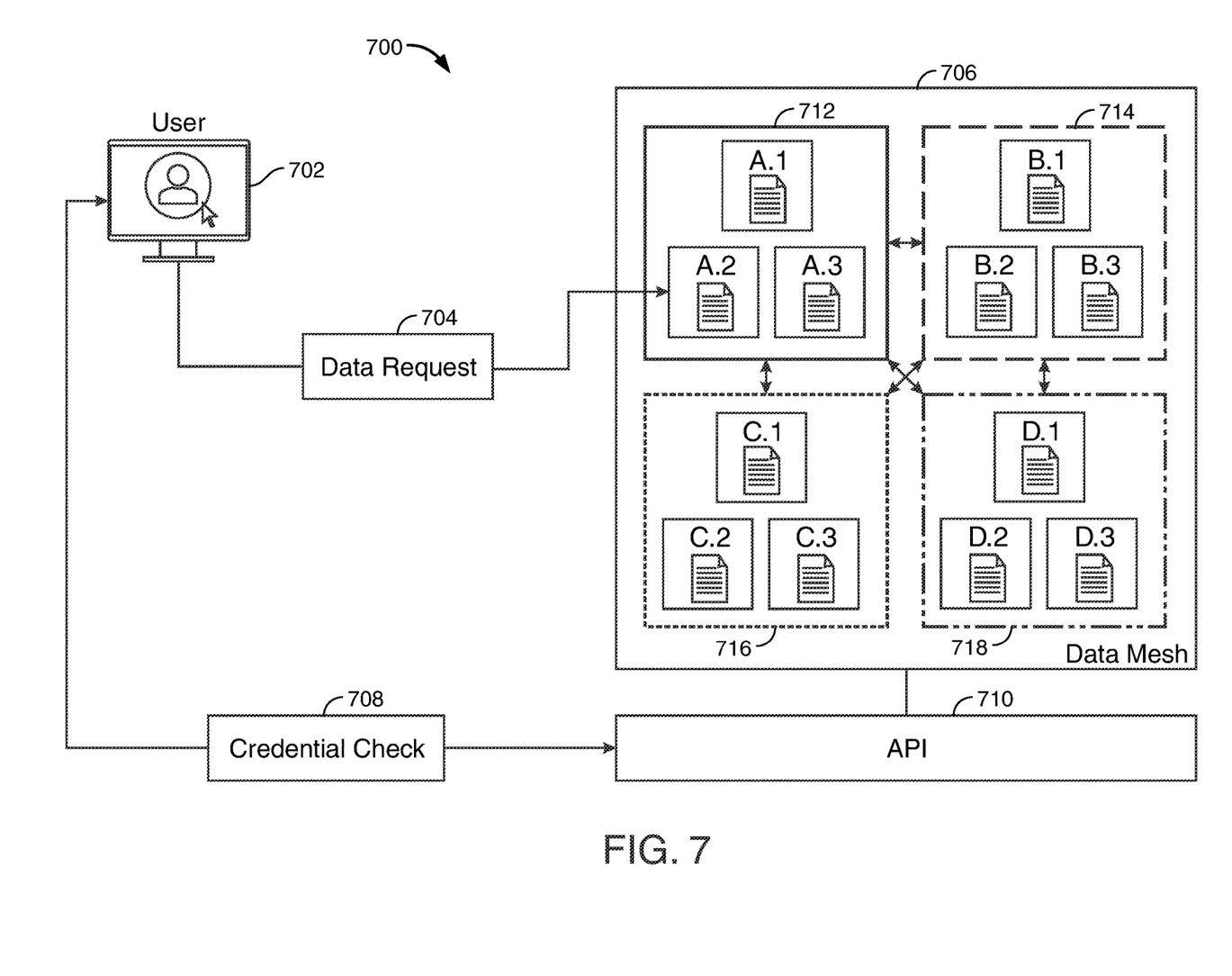
FIG. 7 shows yet another illustrative diagram in accordance with principles of the invention.
Figure 8:
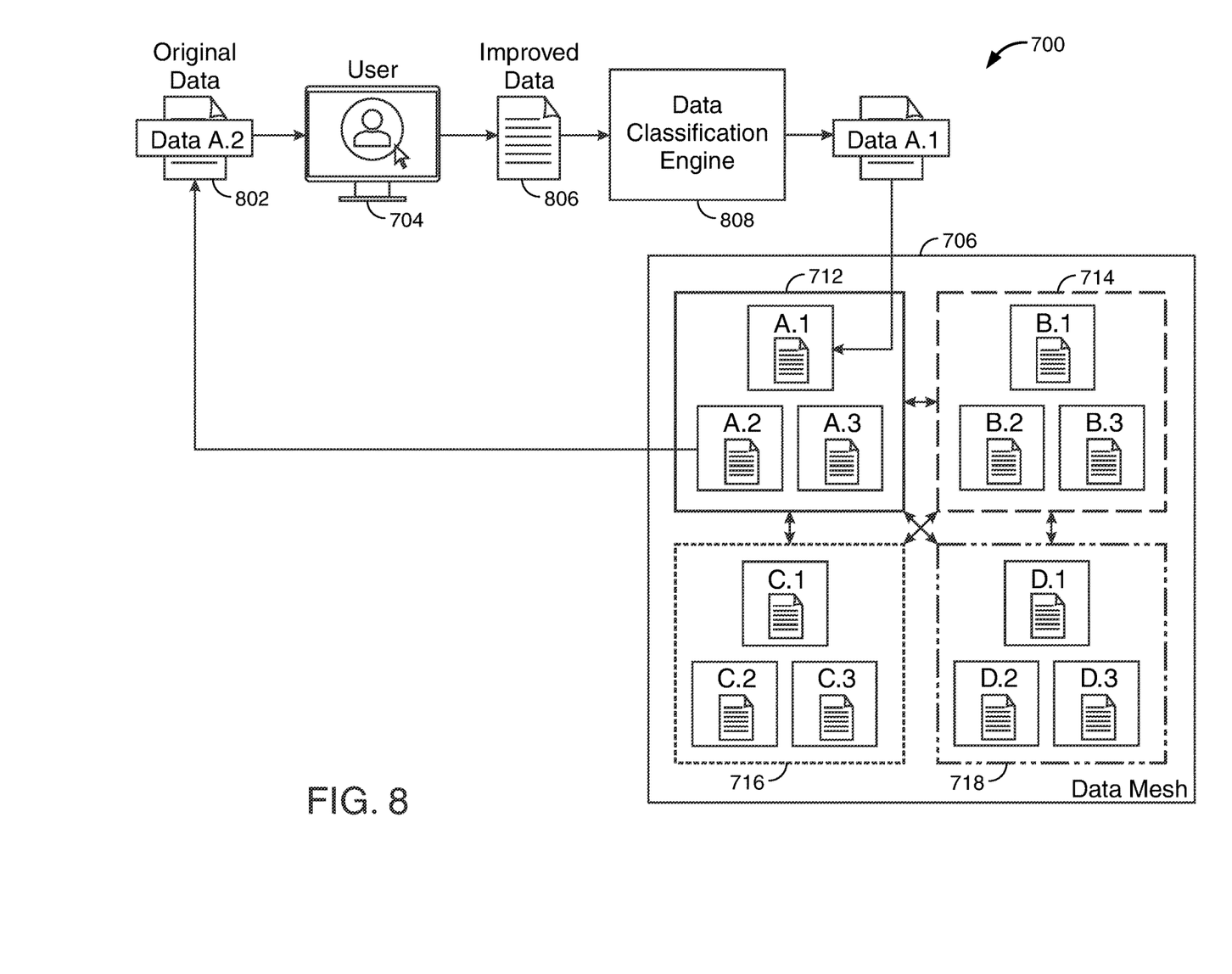
FIG. 8 shows yet another illustrative diagram in accordance with principles of the invention.

FIG. 7 shows illustrative system 700. System 700 may include one or more features described in systems 300, 400, 500 and 600. System 700 may include user node 702. User node 702 may share one or more features in common with computer 101. User node 702 may send data request 704 to data mesh 706. Data mesh 706 may include data regions 712, 714, 716 and 718. Data request 706 may request a dataset from region 712. Data request 706 may initiate credential check 708. Credential check 708 may be initiated at API 710. Credential check 708 may confirm that user node 702 has an assigned security level that is equal to or greater than the assigned security level of the requested dataset. In response to determining that user node 702 has an assigned security level that is equal or greater than the assigned security level of the requested dataset, data mesh 706 may allow for the acquisition of the dataset by user node 702, FIG. 8 shows system 700. Original dataset 802 may have been acquired by user node 702. Original dataset 802 may have a data grade of 8.2. Original dataset 802 may have originated from region 712 of data mesh 706. Original dataset 802 may have been acquired by user node 702.

User node 702 may improve dataset 802. User node 702 may approve dataset 802 by improving the data included in dataset 802. User node 702 may add data to dataset 802. User node 702 may add controls, settings, values and any other suitable enhancement to dataset 802. Upon enhancing dataset 802 enhanced dataset 806 may be created. Enhanced dataset 806 may be transmitted through data classification engine 808. Data classification engine 808 may categorize enhanced dataset 806. Data classification engine 808 may classify enhanced dataset 806. Data classification engine 808 may assign an updated data grade. Data classification engine 808 may assign a security level to enhanced dataset 806. Enhanced dataset 806 may have been updated from a data grade of A.2 to a data grade of A.1. Enhanced dataset 806 may be stored at a corresponding region in data mesh 706. The corresponding region may correspond to the updated data grade.

Figure 9:
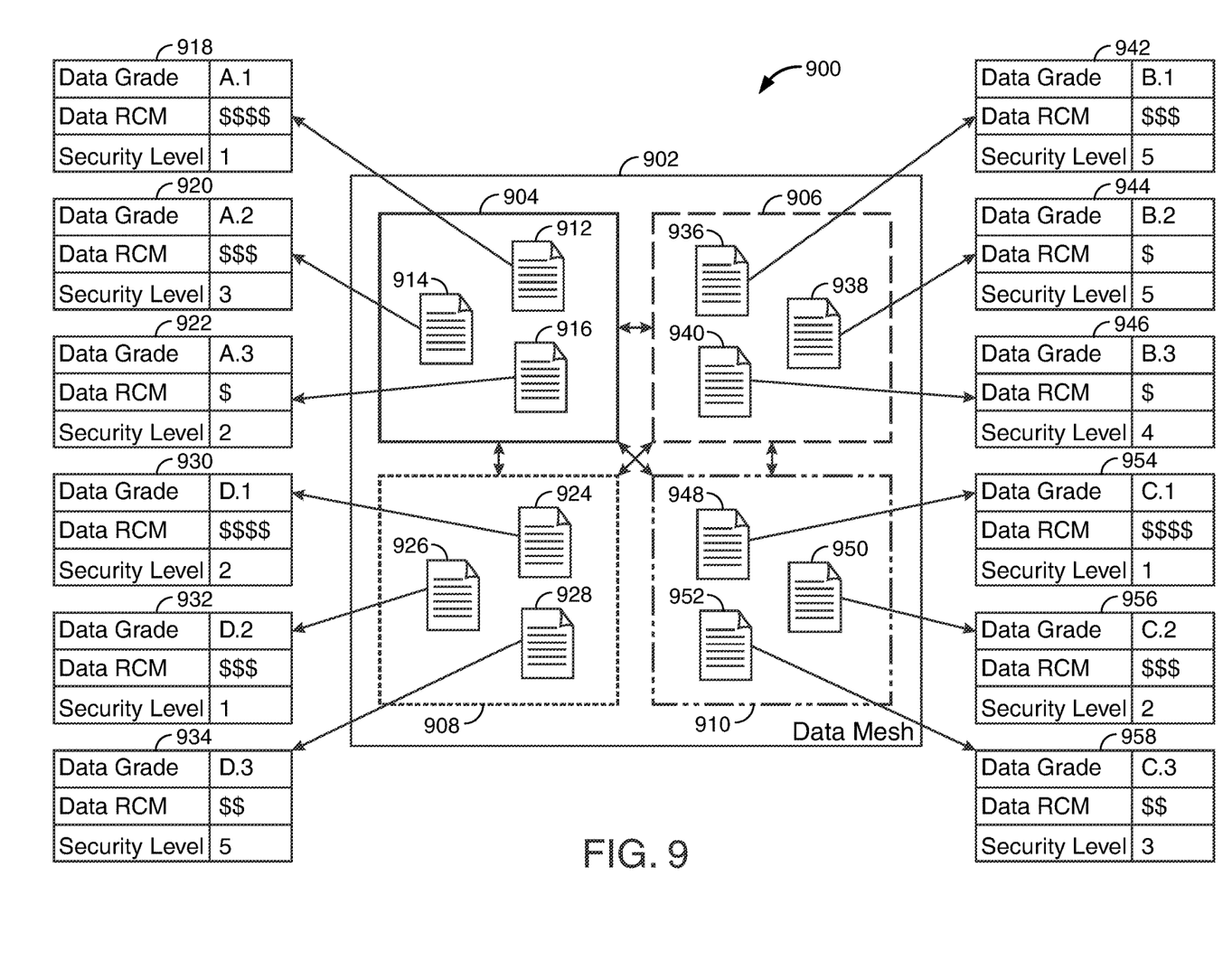
FIG. 9 shows an illustrative flow chart in accordance with principles of the invention.

FIG. 9 may show illustrative system 900. System 900 may include one or more features described in systems 300, 400, 500, 600 and 700. System 900 may include data mesh 902. Data mesh 902 may include data regions 904, 906, 908 and 910. Data regions 904, 906, 908 and 910 may each correspond to a different domain. Data region 904 may include datasets 912, 914 and 916. Datasets 912, 914 and 916 may correspond to the same domain as region 904. Data region 906 may include datasets 936, 938 and 940. Datasets 936, 938 and 940 may correspond to the same domain as region 906. Data region 908 may include datasets 924, 926 and 928. Datasets 924, 926 and 928 may correspond to the same domain as region 908. Data region 910 may include datasets 948, 950 and 952. Datasets 948, 950 and 952 may correspond to the same domain as region 910.

Each dataset may have associated metadata location. The associated metadata location may include a data grade, a data RCM and a security level of the dataset. Dataset 912 may have associated metadata location 918. Dataset 914 may have associated metadata location 920. Dataset 916 may have associated metadata location 922. Dataset 936 may have associated metadata location 942. Dataset 938 may have associated metadata location 944. Dataset 940 may have associated metadata location 946. Dataset 924 may have associated metadata location 930. Dataset 926 may have associated metadata location 932. Dataset 928 may have associated metadata location 934. Dataset 948 may have associated metadata location 954. Dataset 950 may have associated metadata location 956. Dataset 952 may have associated metadata location 958.

Thus, methods and apparatus for a DATA SWAPPING USING A CATEGORIZED DATA MESH are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for dynamic data swapping in a categorized data mesh, the method comprising:
   receiving raw data at a node, the raw data comprising one or more datasets;
   classifying the raw data at a data classification engine, the data classification engine executing an artificial intelligence ("AI") model, the classifying comprising;
   separating the raw data into the one or more datasets;
   determining a data categorization for each dataset, the data categorization corresponding to a domain; and
   assigning to each of the one or more datasets:
      an access level corresponding to a level of obtainability of the data;
      a control setting corresponding to a rating of manageability of the data; and
      a data value corresponding to a ranking of usefulness of the data;
   computing a data grade for each of the one or more datasets, the computing based on a combination of the assigned access level, the control setting, and the data value;
   assigning the computed data grade to each of the datasets;
   tagging each dataset with a security clearance level;
   storing each dataset at a location in a data mesh that corresponds to:
      the determined data categorization;
      the assigned data grade; and
      the tagged security clearance level;
   determining a resource consumption metric ("RCM") for each of the datasets based at least in part on the data grade and security level; and
   storing the determined RCM and tagged security level in a metadata associated with each dataset.

2. The method of claim 1 wherein the RCM is an amount of resources necessary to provide in order to acquire one dataset.

3. The method of claim 2 wherein the node is a first node, and the dataset is a first dataset, the method further comprising:
   receiving a data acquisition request at the first node from a second node requesting acquisition of the dataset;
   in response to receiving the data acquisition request, mining using an application programming interface ("API"), the determined RCM and security level for the dataset from the associated metadata;
   transmitting the mined RCM and security level to the second node;
   in response to determining that the second node has an assigned security level that is the same or greater than an assigned security level of the dataset, approving the acquisition of the dataset; and
   in response to receiving, from the second node, an amount of resources corresponding to the determined RCM of the dataset, transmitting the dataset to the second node.

4. The method of claim 2 wherein the node is a first node, and the dataset is a first dataset, the method further comprising:
   receiving a data acquisition request at the first node from a second node requesting acquisition of the dataset;
   in response to the receiving the data acquisition request, mining using an application programming interface ("API"), the determined RCM and security level for the dataset from the associated metadata;
   transmitting the mined RCM and security level to the second node; and
   in response to determining that the second node has an assigned security level that is less than an assigned security level of the dataset, halting the transmission of the dataset.

5. The method of claim 2 wherein the node is a first node, and the dataset is a first dataset, the method further comprising dynamically updating the RCM of the dataset, the method comprising:
   purchasing the first dataset from the first node, at a second node;
   enhancing data included in the dataset, said enhancing creating a second dataset;
   determining a data categorization for the second dataset, the categorization corresponding to a domain;
   assigning to the second dataset:
      an access level corresponding to a level of obtainability of the data;
      a control setting corresponding to a rating of manageability of the data; and
      a data value corresponding to a ranking of usefulness of the data;
   computing a data grade for the second dataset, the computing based on a combination of the access level, the control setting, and the data value assigned to the second dataset;
   tagging the second dataset with a security level;
   storing the second dataset at a corresponding location within the data mesh;
   determining an RCM for the second dataset based at least in part on the data grade and security level; and
   storing the determined RCM and tagged security level in a metadata associated with the second dataset.

6. The method of claim 5 wherein acquisition of the dataset by the second node from the first node is managed by a third node.

7. The method of claim 5 wherein the computed data grade of the second dataset is greater than the computed data grade of the first dataset.

8. The method of claim 5 wherein the determined RCM of the second dataset is greater than the determined RCM of the first dataset.

9. The method of claim 1 wherein the data mesh is configured to:
   be divided into specific regions, each region defined by a domain; and
   store datasets in regions corresponding to the determined data categorization.

10. The method of claim 1 further comprising using testing and training datasets to train the AI model.

11. Apparatus for dynamic data brokerage in a categorized data mesh, the apparatus comprising:
   a node configured to receive raw data, the raw data including one or more datasets;
   a data classification engine, the data classification engine running an artificial intelligence ("AI") model, the data classification engine configured to:
      classify the raw data;
      separate the raw data into the one or more datasets;

determine a data categorization for each dataset, the data categorization corresponding to a domain; and assign to each of the one or more datasets:
- an access level corresponding to a level of obtainability of the data;
- a control setting corresponding to a rating of manageability of the data; and
- a data value corresponding to a ranking of usefulness of the data;

compute a data grade for each of the one or more datasets, the computation based on a combination of the assigned access level, the control setting, and the data value;

assign the computed data grade to each of the datasets;

tag each dataset with a security level;

store each dataset to a location in a data mesh that corresponds to the:
- determined data categorization;
- assigned data grade; and
- tagged security clearance level;

determine a resource consumption metric ("RCM") for each of the datasets based at least in part on the data grade and security level; and store the determined RCM and tagged security level in a metadata associated with each dataset.

12. The apparatus of claim 11 wherein the RCM is an amount of recourses necessary to provide in order to acquire one dataset.

13. The apparatus of claim 12 wherein the node is a first node, and the dataset is a first dataset, the apparatus further configured to:
receive a data acquisition request at the first node from a second node requesting acquisition of the dataset;
mine, using an application programming interface ("API"), the determined RCM and security level for the dataset from the associated metadata;
transmit the mined RCM and security level to the second node;
in response to a determination that the second node has an assigned security level that is the same or greater than an assigned security level of the dataset, approve the acquisition of the dataset; and
in response to a receival, from the second node, an amount of resources corresponding to the determined RCM of the dataset, transmit the dataset to the second node.

14. The apparatus of claim 12 wherein the node is a first node, and the dataset is a first dataset, the apparatus further configured to:
receive a data acquisition request at the first node from a second node requesting acquisition of the dataset;
mine, using an application programming interface ("API"), the determined RCM and security level for the dataset from the associated metadata;
transmit the mined RCM and security level to the second node; and
in response to a determination that the second node has an assigned security level that is less than an assigned security level of the dataset, prevent the transmission of the dataset.

15. The apparatus of claim 12 wherein the node is a first node, and the dataset is a first dataset, the apparatus further configured to dynamically update the RCM of the dataset, the apparatus configured to:
acquiring the first dataset from the first node, at a second node;
enhance data included in the dataset, said enhancement creating a second dataset;
determine a data categorization for the second dataset, the categorization corresponding to a domain;
assign to the second dataset:
- an access level corresponding to a level of obtainability of the data;
- a control setting corresponding to a rating of manageability of the data; and
- a data value corresponding to a ranking of usefulness of the data;

compute a data grade for the second dataset, the computation based on a combination of the access level, the control setting, and the data value assigned to the second dataset;

tag the second dataset with a security level;

store the second dataset at a corresponding location within the data mesh;

determine an RCM for the second dataset based at least in part on the data grade and security level; and store the determined RCM and tagged security level in a metadata associated with the second dataset.

16. The apparatus of claim 15 wherein acquisition of the dataset by the second node from the first node is managed by a third node.

17. The apparatus of claim 15 wherein the computed data grade of the second dataset is greater than the computed data grade of the first dataset.

18. The apparatus of claim 15 wherein the determined RCM of the second dataset is greater than the determined RCM of the first dataset.

19. The apparatus of claim 11 wherein the data mesh is configured to:
be divided into specific regions, each region defined by a domain; and
store datasets in regions corresponding to the determined data categorization.

20. The apparatus of claim 11 further configured to use testing and training datasets to train the AI model.

* * * * *